(12) United States Patent
Yamaguchi

(10) Patent No.: US 7,699,231 B2
(45) Date of Patent: Apr. 20, 2010

(54) READER/WRITER AND MOBILE COMMUNICATION APPARATUS

(75) Inventor: Koichi Yamaguchi, Fukui-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 438 days.

(21) Appl. No.: 10/565,697

(22) PCT Filed: Jun. 30, 2004

(86) PCT No.: PCT/JP2004/009180

§ 371 (c)(1),
(2), (4) Date: Jan. 24, 2006

(87) PCT Pub. No.: WO2005/017821

PCT Pub. Date: Feb. 24, 2005

(65) Prior Publication Data

US 2007/0051807 A1    Mar. 8, 2007

(30) Foreign Application Priority Data

Aug. 13, 2003  (JP)  ............................. 2003-292875
Mar. 11, 2004  (JP)  ............................. 2004-069103

(51) Int. Cl.
*G06K 7/08* (2006.01)
*G06K 19/06* (2006.01)
*H04M 1/00* (2006.01)
*H04B 1/38* (2006.01)
*H01Q 1/00* (2006.01)
*H01Q 7/08* (2006.01)

(52) U.S. Cl. .................. 235/492; 235/449; 343/787; 343/788; 455/90.3; 455/550.1

(58) Field of Classification Search .................. 235/492, 235/441, 487, 449, 486, 383; 343/742, 841, 343/482, 787, 788; 340/572.5; 455/50.1, 455/550.1, 550.3
See application file for complete search history.

(56) References Cited

U.S. PATENT DOCUMENTS

| 5,424,527 | A  | * | 6/1995  | Takahira ...................... 235/492 |
| 6,018,298 | A  | * | 1/2000  | Endo et al. .................. 343/841 |
| 6,137,447 | A  | * | 10/2000 | Saitoh et al. ................. 235/492 |
| 6,216,954 | B1 | * | 4/2001  | Kuwamoto et al. .......... 235/486 |
| 6,378,774 | B1 | * | 4/2002  | Emori et al. ................. 235/492 |
| 6,463,263 | B1 | * | 10/2002 | Feilner et al. ............... 455/90.1 |
| 6,764,005 | B2 | * | 7/2004  | Cooper ........................ 235/492 |

(Continued)

FOREIGN PATENT DOCUMENTS

JP  06-13214 U  2/1994

(Continued)

*Primary Examiner*—Thien M. Le
*Assistant Examiner*—Thien T Mai
(74) *Attorney, Agent, or Firm*—Keating & Bennett, LLP

(57) ABSTRACT

A non-contact reader/writer for an IC card includes an antenna substrate provided with a loop antenna and a capacitor on its upper surface, a control substrate provided with a transmitting/receiving circuit and a chip coil on its upper surface, and a magnetic sheet disposed between the antenna substrate and the control substrate. A magnetic flux generated by the chip coil on the control substrate passes through the loop antenna to cause magnetic coupling, so that the loop antenna and the transmitting/receiving circuit need not be connected to each other through a communication cable.

9 Claims, 7 Drawing Sheets

U.S. PATENT DOCUMENTS

| | | | |
|---|---|---|---|
| 2001/0030238 A1* | 10/2001 | Arisawa | 235/492 |
| 2002/0160725 A1* | 10/2002 | Toyoda et al. | 455/90 |
| 2003/0169169 A1 | 9/2003 | Wuidart et al. | |
| 2004/0075616 A1* | 4/2004 | Endo et al. | 343/895 |
| 2004/0266486 A1* | 12/2004 | Deguchi et al. | 455/562.1 |
| 2005/0075150 A1* | 4/2005 | Takagi et al. | 455/550.1 |
| 2005/0162331 A1* | 7/2005 | Endo et al. | 343/788 |
| 2005/0189425 A1* | 9/2005 | Itou | 235/492 |
| 2005/0253685 A1* | 11/2005 | Catteau et al. | 235/383 |

FOREIGN PATENT DOCUMENTS

| | | |
|---|---|---|
| JP | 11-238103 A | 8/1999 |
| JP | 11-288447 A | 10/1999 |
| JP | 2003-099731 A | 4/2003 |
| JP | 2003-179526 A | 6/2003 |
| WO | WO 02/15116 A1 | 2/2002 |

* cited by examiner

READER/WRITER AND MOBILE COMMUNICATION APPARATUS

BACKGROUND OF THE INVENTION

1. Field of the Invention

The present invention relates to a reader/writer and a mobile communication apparatus, and more particularly to a reader/writer communicating with an IC card or the like in a non-contact manner and a mobile communication apparatus such as a mobile phone.

2. Description of the Related Art

Readers/writers for an IC card, performing communication in a non-contact manner by using magnetic coupling, have been known (e.g., see Japanese Unexamined Utility Model Registration Application Publication No. 6-13214 and Japanese Unexamined Patent Application Publication No. 11-288447). These known readers/writers 100 for an IC card include an antenna substrate 101 provided with a loop antenna 102 on its upper surface and a control substrate 103 provided with a transmitting/receiving circuit (not shown) on its upper surface, as shown in FIG. 13.

The loop antenna 102 is a printed coil provided on the upper surface of the antenna substrate 101 by printing or the like. In order to ensure a predetermined or more communication distance between the loop antenna 102 and an IC card, the loop antenna 102 is disposed over as wide an area as possible on the upper surface of the antenna substrate 101, so that a wide range of magnetic flux distribution can be obtained.

The lower surface of the control substrate 103 is provided with a ground electrode over a wider area. Due to this configuration, the antenna substrate 101 and the control substrate 103 need to be placed with a predetermined distance therebetween so that the flow of a magnetic flux generated by the loop antenna 102 is not obstructed by the ground electrode. Also, the transmitting/receiving circuit on the control substrate 103 and the loop antenna 102 electrically connect to each other through a communication cable 105.

However, since the known reader/writer 100 for an IC card includes the communication cable 105 to electrically connect the transmitting/receiving circuit on the control substrate 103 and the loop antenna 102, the communication cable 105 needs to be soldered to connectors, which requires many assembling steps. Further, space for routing the communication cable 105 needs to be ensured, which is a factor inhibiting the miniaturization of the reader/writer 100 for an IC card.

On the other hand, this type of reader/writer for an IC card may be configured in a compact size so as to be incorporated into a mobile communication apparatus such as a mobile phone. However, it is very difficult to incorporate a control substrate and an antenna substrate into a mobile communication apparatus, which is originally made compact.

SUMMARY OF THE INVENTION

In order to overcome the problems described above, preferred embodiments of the present invention provide a reader/writer that can be configured without using a communication cable to electrically connect a transmitting/receiving circuit on a control substrate and a loop antenna.

Another preferred embodiment of the present invention provides a mobile communication apparatus in which the reader/writer is incorporated with high space efficiency.

The reader/writer according to the present preferred embodiment of the invention includes an antenna substrate provided with a loop antenna and a control substrate provided with a transmitting/receiving circuit. Magnetic coupling between a coil provided on the control substrate and the loop antenna causes the loop antenna and the transmitting/receiving circuit to be electrically connected to each other.

With this configuration, the loop antenna and the transmitting/receiving circuit are electrically connected to each other without using a communication cable.

In the reader/writer according to the present preferred embodiment, a plate-like or sheet-like magnetic body is placed on a surface of the antenna substrate, the surface is facing the control substrate, and the coil provided on the control substrate and the loop antenna are magnetically coupled through a space defined by the magnetic body.

By providing the magnetic body between the antenna substrate and the control substrate, the radiation efficiency of a magnetic flux generated by the loop antenna does not degrade and the communication distance to an IC card does not decrease even if the reader/writer is thin. In this case, by placing the magnetic body while omitting a portion above the coil provided on the control substrate, the magnetic flux generated by the coil provided on the control substrate can reach the loop antenna.

Further, by positioning the coil provided on the control substrate inside an inner portion of the loop antenna and also allowing the coil to be adjacent to the inner portion of the loop antenna, the magnetic coupling between the coil provided on the control substrate and the loop antenna can be further strengthened.

The mobile communication apparatus according to another preferred embodiment includes the reader/writer according to the present invention. The mobile communication apparatus according to the present preferred embodiment includes a package that includes an opening and is provided with the control substrate at a position facing the opening, and a lid member that can be fitted in the opening and is incorporated with the antenna substrate.

In the reader/writer according to another preferred embodiment, the electrical connection between the loop antenna and the transmitting/receiving circuit can be realized wirelessly by achieving the magnetic coupling between the coil provided on the control substrate and the loop antenna provided on the antenna substrate. As a result, when the reader/writer is to be incorporated into a mobile communication apparatus or the like, the degree of freedom of design and ease of assembly are significantly improved.

In the mobile communication apparatus according to another preferred embodiment, the reader/writer is compactly accommodated by utilizing a wireless configuration, which is one of the advantages of the reader/writer. In particular, by placing the control substrate at a position facing the opening of the package and by fitting the lid member incorporated with the antenna substrate to the opening, the reader/writer can be accommodated with high space efficiency.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the reader/writer and the mobile communication apparatus according to the present invention are described with reference to the attached drawings.

First Preferred Embodiment

Figure 1:
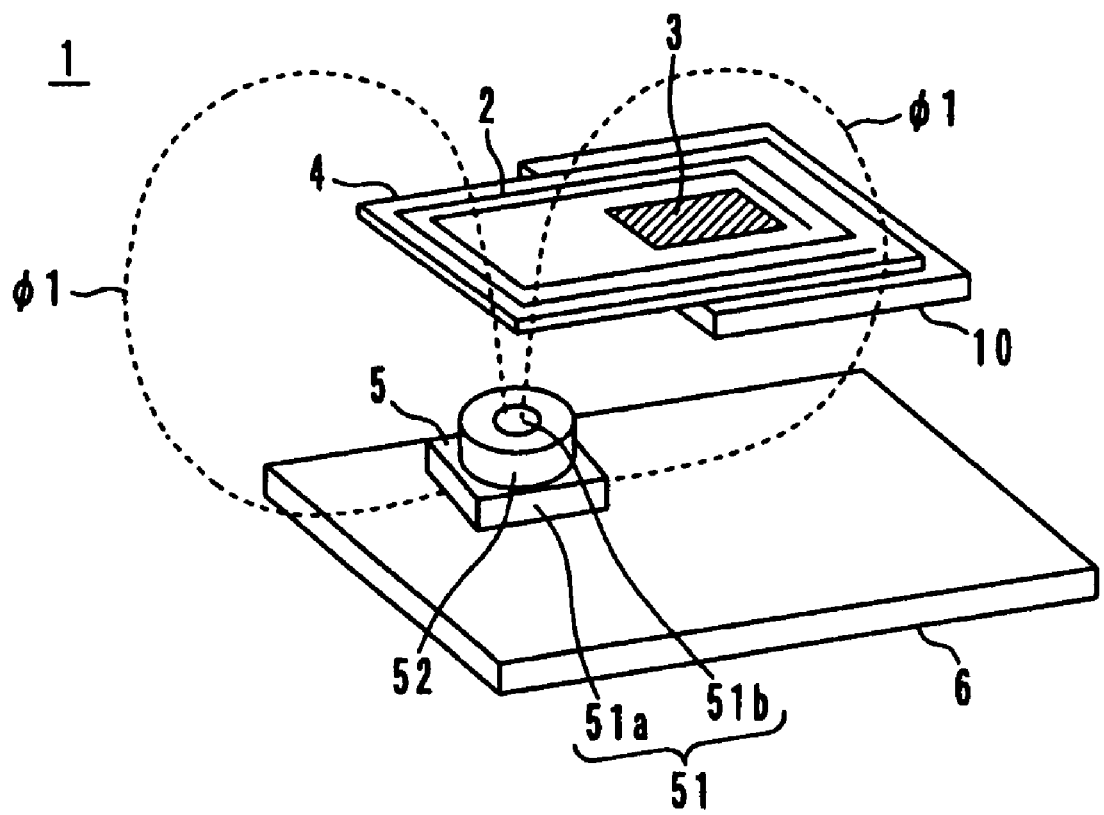
FIG. 1 is an exploded perspective view showing a reader/writer according to a first preferred embodiment of the present invention.
Figure 2:
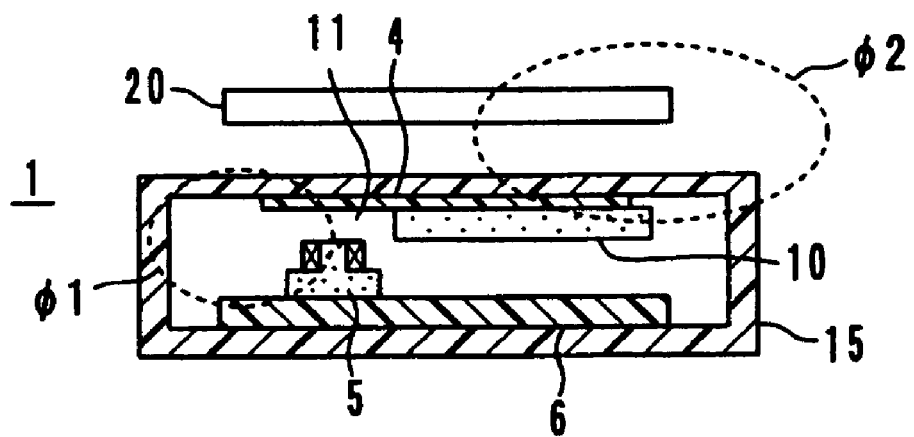
FIG. 2 is a vertical cross-sectional view of the reader/writer shown in FIG. 1.

FIG. 1 is an exploded perspective view of a non-contact reader/writer 1 for an IC card, and FIG. 2 is a vertical cross-sectional view thereof. The non-contact reader/writer 1 for an IC card includes an antenna substrate 4 provided with a loop antenna 2 and a capacitor 3 on its upper surface, a control substrate 6 provided with a transmitting/receiving circuit (not shown) and a chip coil 5 on its upper surface, a magnetic sheet 10 placed between the antenna substrate 4 and the control substrate 6, and an insulating case 15.

The chip coil 5 on the control substrate 6 is longitudinally wound and includes a magnetic core 51 having a lower flange portion 51a, a body portion 51b, and a winding 52 wound on the body portion 51b. The chip coil 5 is arranged such that the coil axis thereof is vertical to the control substrate 6 and such that the open end surface of the body portion 51b is directed above. The chip coil 5 is a coil of an open magnetic circuit type to emit a magnetic flux φ1 to the upper side of the control substrate 6 and functions as an antenna coil (primary coil).

Figure 3:
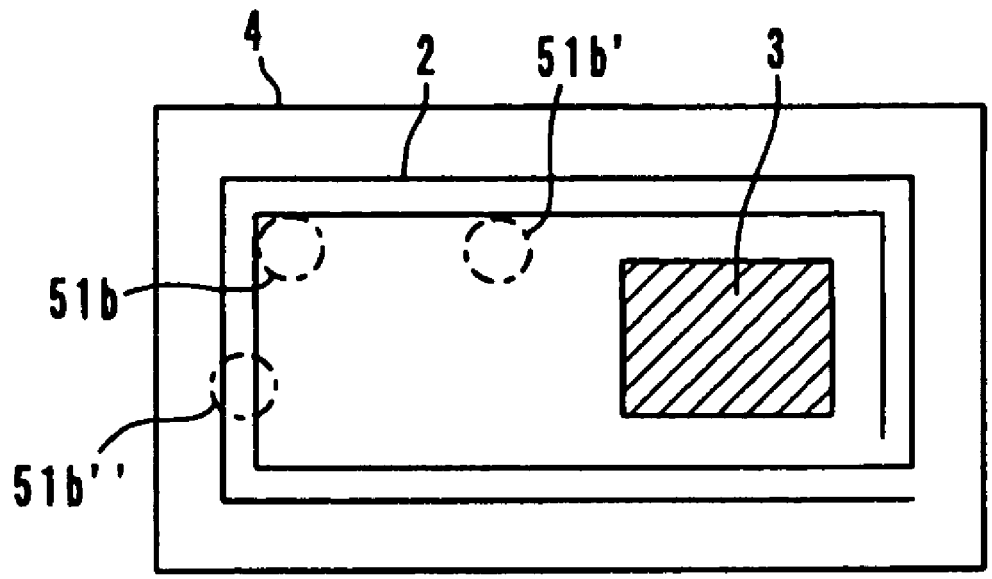
FIG. 3 is a plan view showing the position relationship between a loop antenna and a chip coil.

Further, the antenna substrate 4 is placed above the control substrate 6 such that the antenna substrate 4 is substantially parallel with the control substrate 6. Preferably, as shown in FIG. 3, the chip coil 5 and the loop antenna 2 should be arranged such that the open end surface of the body portion 51b of the chip coil 5 is positioned inside the inner portion of the loop antenna 2 and is adjacent to the inner portion of the loop antenna 2. With this positioning, the loop antenna 2 is placed at an area where the density of the magnetic flux φ1 generated by the chip coil 5 is high, so that strong magnetic coupling between the loop antenna 2 and the chip coil 5 can be obtained.

In particular, when the body portion 51b of the chip coil 5 is placed at a corner of the loop antenna 2, stronger magnetic coupling can be obtained compared to a case where the body portion 51b is placed at a side of the inner portion of the loop antenna 2 (see reference numeral 51b' in FIG. 3). Incidentally, when the body portion 51b is placed just under the coil conductor of the loop antenna 2, as indicated by reference numeral 51b" in FIG. 3, the magnetic coupling is weak, which is not preferable.

The loop antenna 2 is preferably a printed coil (secondary coil) formed on the upper surface of the antenna substrate 4 by printing or the like. The loop antenna 2 is provided over as wide an area as possible on the upper surface of the antenna substrate 4 (a size of several centimeters×several centimeters) so as to ensure a predetermined or more communication distance between the loop antenna 2 and an IC card 20, so that a wide range of magnetic flux distribution can be obtained.

The capacitor 3 is preferably a thin-film capacitor formed by stacking a plurality of capacitor electrodes with insulating layers therebetween. The inductance of the loop antenna 2 and the capacitance of the capacitor 3 define an LC resonance circuit. The resonance frequency of the LC resonance circuit is set in accordance with a frequency generated by the control substrate 6.

When the reader/writer 1 for an IC card is thin, the loop antenna 2 becomes close to the control substrate 6. In this case, a magnetic flux φ2 generated by the loop antenna 2 is likely to cause the ground electrode (not shown), which is provided over a wide area of the lower surface of the control substrate 6, to generate overcurrent. Accordingly, overcurrent loss decreases the radiation efficiency of the magnetic flux φ2, so that the communication distance to the IC card 20 becomes short.

In the first preferred embodiment, the magnetic sheet 10 is fixed on the surface facing the control substrate 6 of the antenna substrate 4. With this configuration, the magnetic flux φ2 uses the magnetic sheet 10 as a magnetic path and passes through a gap between the loop antenna 2 and the control substrate 6. That is, the magnetic flux φ2 is less likely to reach the ground electrode of a wide area provided on the lower surface of the control substrate 6, which reduces overcurrent loss in the ground electrode. As a result, the radiation efficiency of the magnetic flux φ2 does not degrade and the communication distance to the IC card 20 does not decrease.

At this time, the magnetic sheet 10 is placed while omitting a portion above the chip coil 5 so as to provide a space 11 above the chip coil 5 provided on the control substrate 6. The magnetic flux φ1 generated by the chip coil 5 can easily reach the loop antenna 2 through the space 11 provided by the magnetic sheet 10.

The magnetic sheet 10 is preferably formed by kneading resin with magnetic powder into a sheet. A scale-like soft magnetic metal powder is suitably used as the magnetic powder so that the permeability increases only in an in-plane direction of the sheet and that the anisotropy increases.

Figure 4:
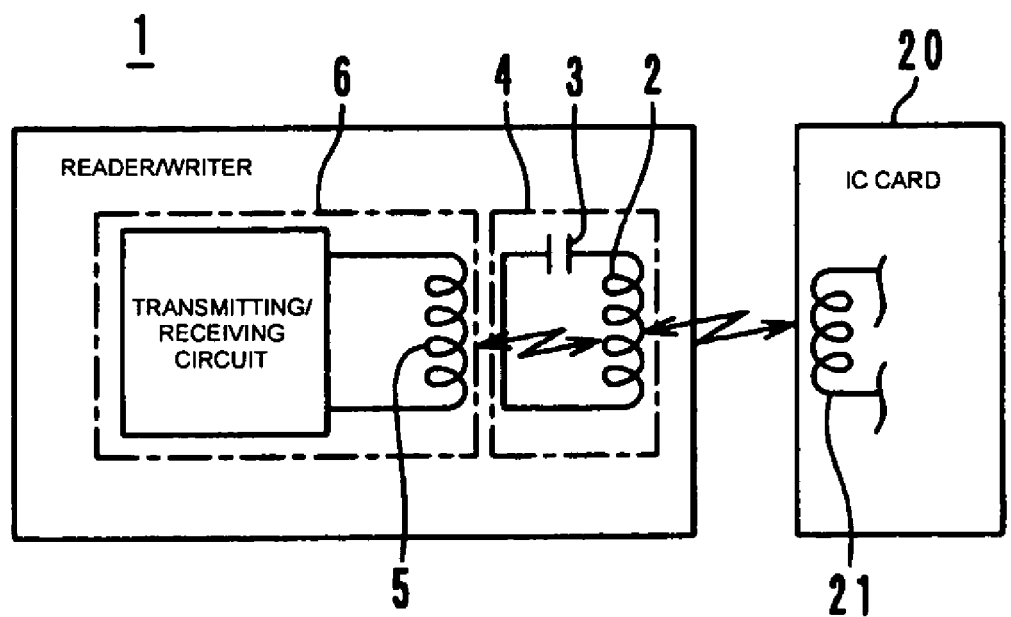
FIG. 4 is an electric circuit block diagram of the reader/writer shown in FIG. 1.

The respective components 4, 6, and 10 are accommodated inside the insulating case 15. The lower surface of the control substrate 6 is fixed to the inner bottom of the case 15, whereas the upper surface of the antenna substrate 4 is fixed on the ceiling of the case 15. FIG. 4 is an electric circuit block diagram showing the reader/writer 1 for an IC card obtained in the above-described manner.

In the reader/writer 1 for an IC card having the above-described configuration, the magnetic flux φ1 generated by the chip coil 5 on the control substrate 6 passes through the loop antenna 2 to cause magnetic coupling, so that the loop antenna 2 need not be connected to the transmitting/receiving circuit through a communication cable. Therefore, neither connectors nor a communication cable is required, and assembling steps can be simplified.

Second Preferred Embodiment

Figure 5:
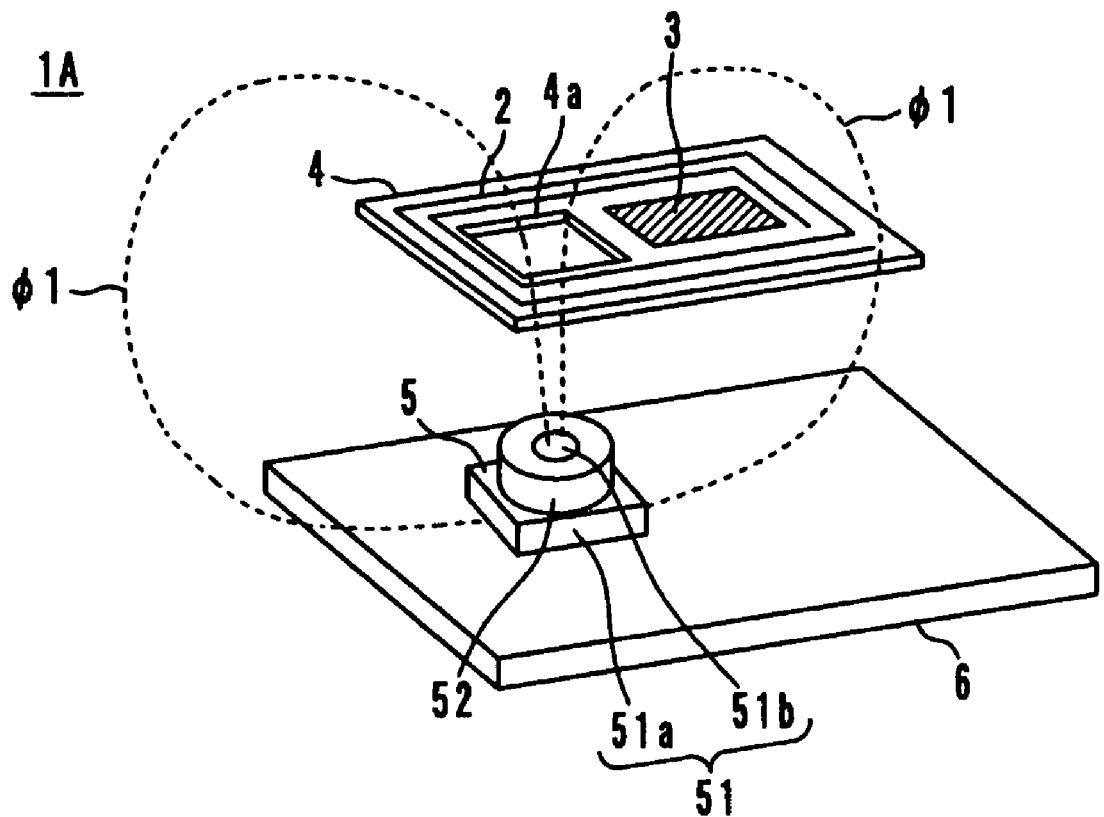
FIG. 5 is an exploded perspective view showing a reader/writer according to a second preferred embodiment of the present invention.
Figure 6:
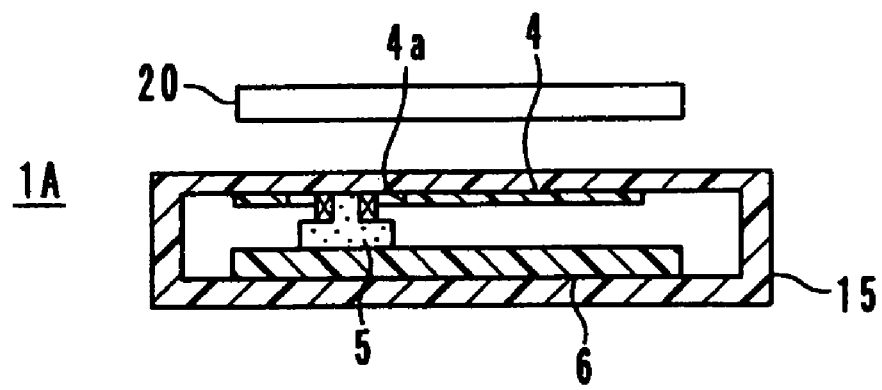
FIG. 6 is a vertical cross-sectional view of the reader/writer shown in FIG. 5.

A non-contact reader/writer 1A for an IC card according to a second preferred embodiment is thinner than the reader/writer 1 for an IC card according to the first preferred embodiment. As shown in FIGS. 5 and 6, the antenna substrate 4 is provided with an opening 4a inside the loop antenna 2. The upper portion of the chip coil 5 is placed through the opening 4a.

In the reader/writer 1A for an IC card having the above-described configuration, the upper portion of the chip coil 5 is accommodated in the opening 4a of the antenna substrate 4, and thus the height thereof can be reduced accordingly. Furthermore, the magnetic coupling between the chip coil 5 and the loop antenna 2 can be further strengthened.

Third Preferred Embodiment

Figure 7:
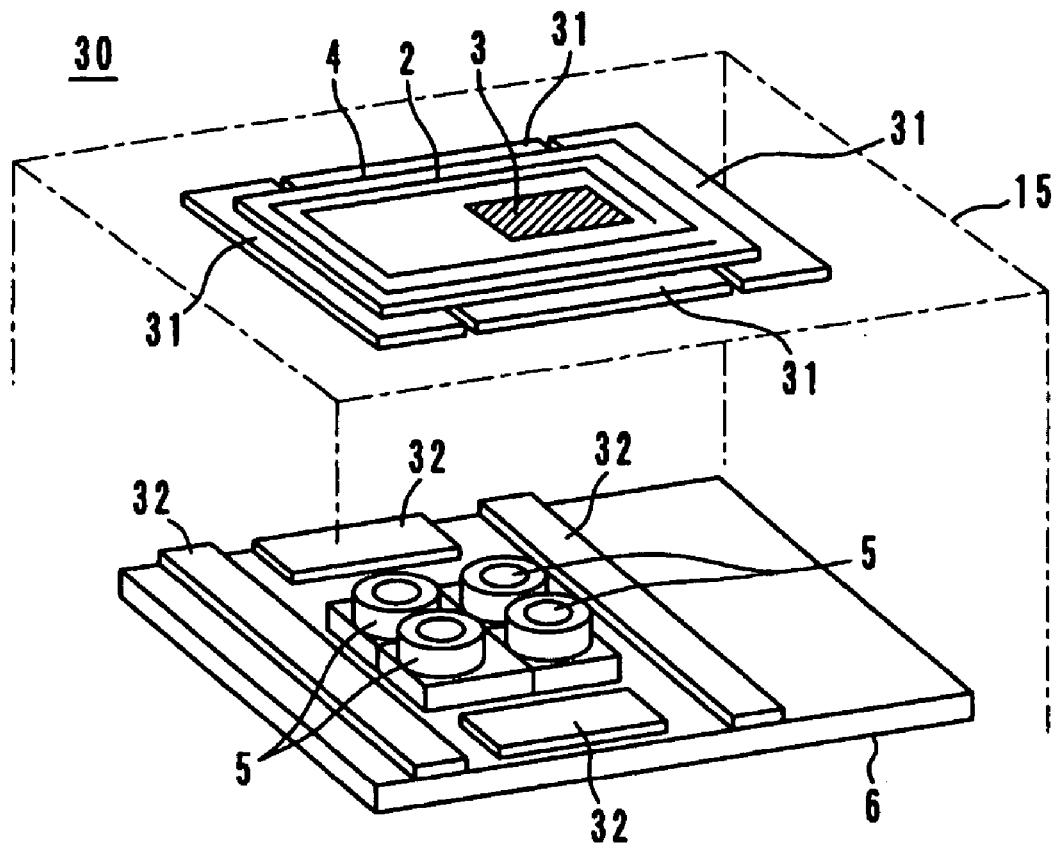
FIG. 7 is an exploded perspective view showing a reader/writer according to a third preferred embodiment of the present invention.
Figure 8:
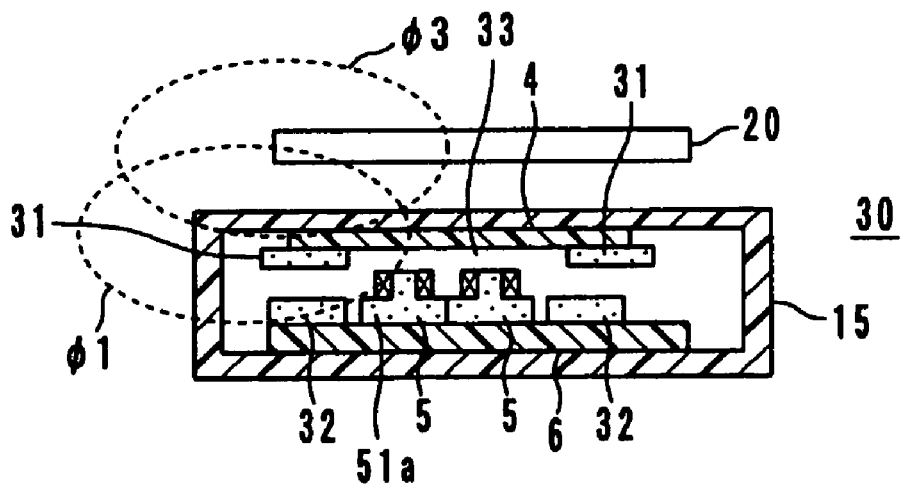
FIG. 8 is a vertical cross-sectional view of the reader/writer shown in FIG. 7.

As shown in FIGS. 7 and 8, in a non-contact reader/writer 30 for an IC card according to a third preferred embodiment, a plurality of (four) chip coils 5 are provided on the control substrate 6 in a rotationally symmetrical pattern. The respective chip coils 5 may be electrically connected either in series or in parallel, but should be connected so that the magnetic fluxes generated by the chip coils 5 have the same polarity.

With this configuration, magnetic fluxes generated by current flowing through the respective chip coils 5 are cancelled to some extent between adjacent chip coils 5, and thus a magnetic flux distribution equivalent to that of a large coil can be obtained. Therefore, sufficient magnetic coupling with the loop antenna 2 can be ensured even if each of the chip coils 5 is small. Further, by using the plurality of chip coils 5, the magnetic coupling does not degrade even if the chip coils 5 are slightly misaligned with the loop antenna 2, and thus the degree of freedom in assembling increases.

In the reader/writer 30 for an IC card, magnetic sheets 32 are fixed on the control substrate 6 surrounding the chip coils 5. Also, magnetic sheets 31 are fixed on the surface facing the control substrate 6 of the antenna substrate 4. The magnetic sheets 31 are arranged to surround the antenna substrate 4 while omitting a portion above the chip coils 5 so that a space 33 is provided above the chip coils 5 provided on the control substrate 6. A magnetic flux $\phi 1$ generated by the chip coils 5 can easily reach the loop antenna 2 through the space 33 provided by the magnetic sheets 31. On the other hand, the magnetic flux 41 from lower flange portions 51a of the chip coils 5 is easily radiated due to the magnetic sheets 32.

Further, due to the magnetic sheets 31, a magnetic flux $\phi 3$ generated by an antenna coil of the IC card 20 (see reference numeral 21 in FIG. 4) easily passes through a gap defined by the control substrate 6. As a result, the communication distance between the reader/writer 30 for an IC card and the IC card 20 can be extended.

Fourth and Fifth Preferred embodiments

As fourth and fifth preferred embodiments, readers/writers 60 and 61 for an IC card in which the degree of freedom of laying out the antenna substrate 4 and the control substrate 6 is high are described.

Figure 9:
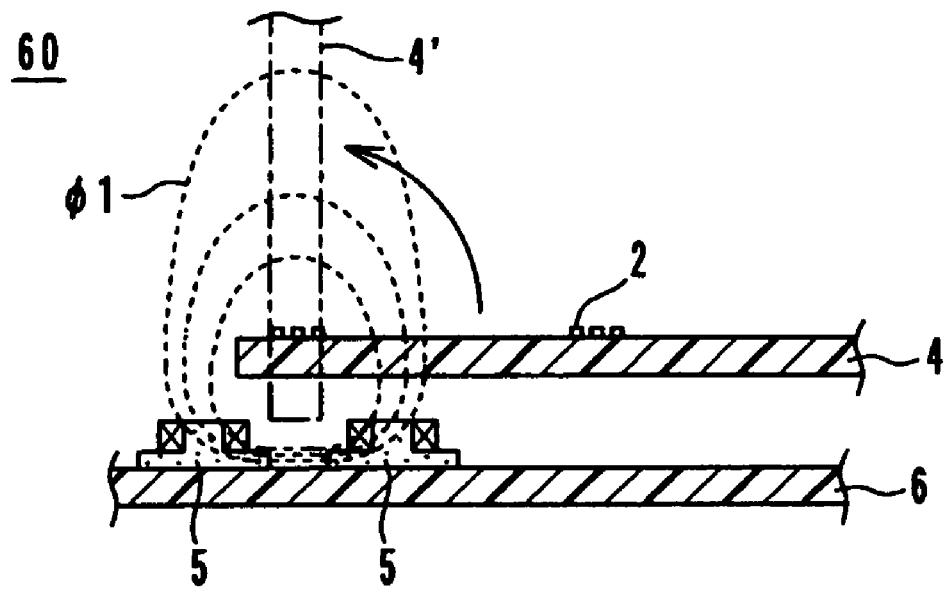
FIG. 9 is a vertical cross-sectional view showing a reader/writer according to a fourth preferred embodiment of the present invention.

In the reader/writer 60 for an IC card shown in FIG. 9, two chip coils 5 provided on the control substrate 6 have opposite polarities. With this configuration, a magnetic flux $\phi 1$ flowing through the two chip coils 5 is generated. The magnetic path of the magnetic flux $\phi 1$ extends long in a direction vertical to the control substrate 6. The magnetic flux $\phi 1$ can pass through the loop antenna 2 to cause magnetic coupling in either case where the antenna substrate 4 is substantially parallel with the control substrate 6 or where the antenna substrate 4 is vertical to the control substrate 6 as indicated with a dashed line 4'.

Figure 10:
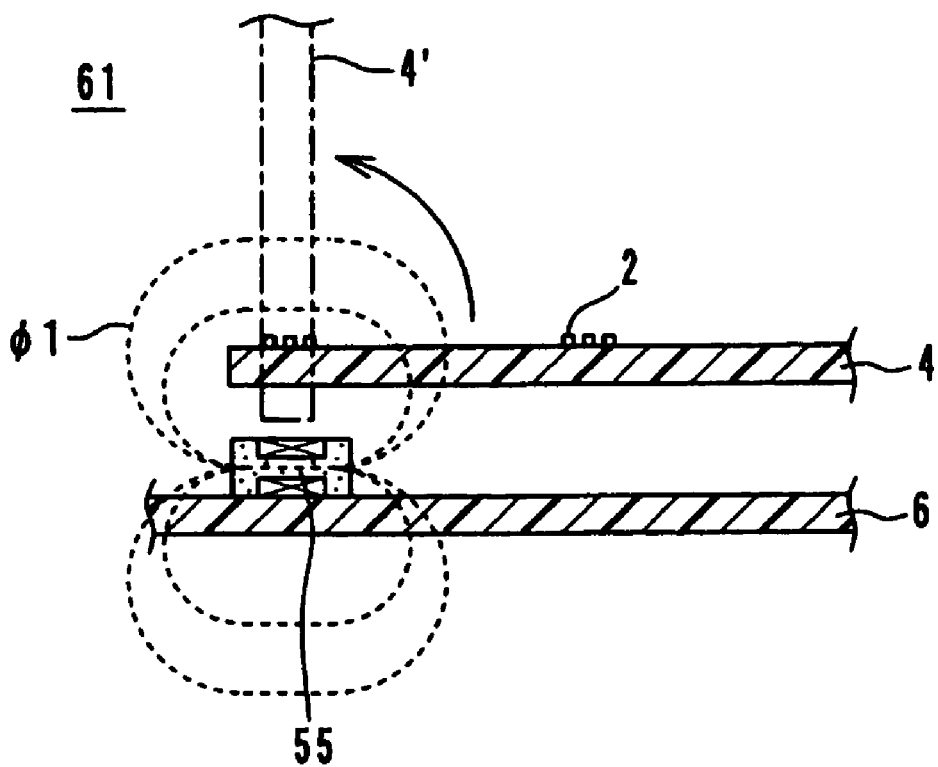
FIG. 10 is a vertical cross-sectional view showing a reader/writer according to a fifth preferred embodiment of the present invention.
Figure 11:
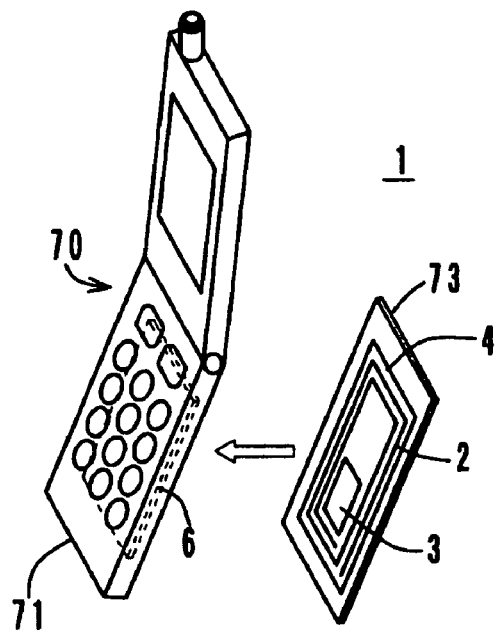
FIG. 11 is a perspective view showing a mobile communication apparatus according to a sixth preferred embodiment of the present invention.
Figure 12:
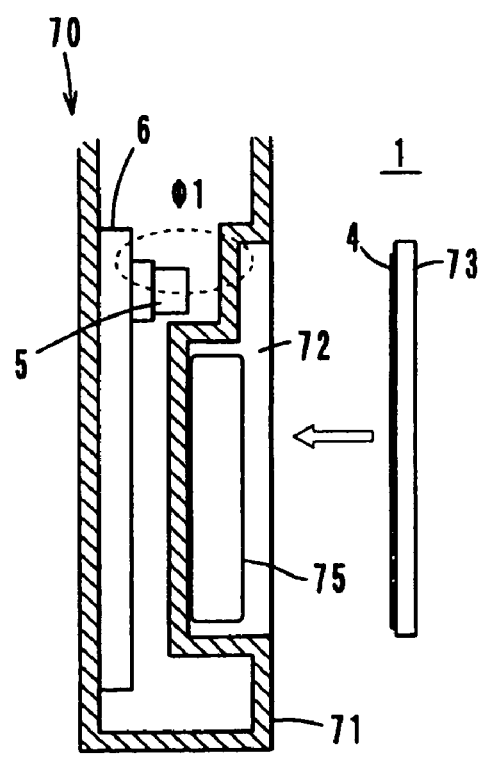
FIG. 12 is a cross-sectional view showing a main part of the mobile communication apparatus shown in FIG. 11.
Figure 13:
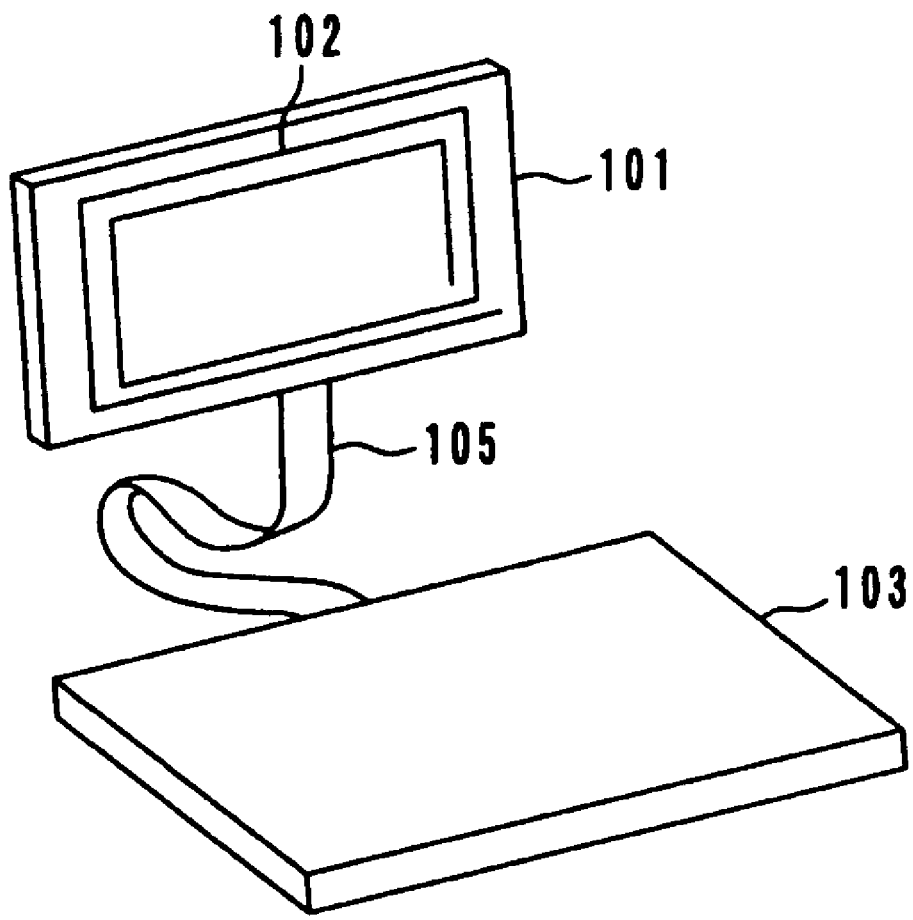
FIG. 13 is a perspective view showing the appearance of a known reader/writer.

On the other hand, in the reader/writer 61 for an IC card shown in FIG. 10, a transversely wound coil 55 is provided on the control substrate 6. A magnetic flux $\phi 1$ generated by the transversely wound coil 55 extends long in a direction that is substantially parallel to the control substrate 6. The magnetic flux $\phi 1$ can pass through the loop antenna 2 to cause magnetic coupling in either case where the antenna substrate 4 is parallel with the control substrate 6 or where the antenna substrate 4 is vertical to the control substrate 6 as indicated with a dashed line 4'.

Sixth Preferred Embodiment

A sixth preferred embodiment is a mobile communication apparatus (mobile phone) 70 incorporated with the reader/writer 1. In this mobile communication apparatus 70, the control substrate 6 and the antenna substrate 4 are efficiently placed in a portion for accommodating a rechargeable battery pack 75, which is provided on the rear side of a folding package 71.

More specifically, the control substrate 6 provided with the chip coil 5 and the transmitting/receiving circuit is placed at a position facing an opening 72, which is provided in the package 71 to accommodate the battery pack 75. The antenna substrate 4 provided with the loop antenna 2 and the capacitor 3 is fixed on the rear surface of a lid member 73 that can be fitted in the opening 72.

The antenna substrate 4 is preferably made of a resin film. The loop antenna 2 is a coil pattern printed on the resin film and the capacitor 3 is a thin-film capacitor, as described in the first preferred embodiment. In this case, the antenna substrate is incorporated in the lid member 73. The size of the loop antenna 2 is preferably several centimeters×several centimeters. The resonance frequency of the resonance circuit defined by the loop antenna 2 and the capacitor 3 is tuned at about 13.56 MHz, which is the frequency generated by the control substrate 6.

With the above-described configuration, the chip coil 5 and the loop antenna 2 are magnetically coupled by the magnetic flux $\phi 1$, so that the control substrate 6 and the antenna substrate 4 are incorporated in the package 70 with high space efficiency.

The reader/writer and the mobile communication apparatus according to the present invention are not limited to the above-described preferred embodiments, but can be variously modified within the scope of the invention.

For example, the chip coil 5 on the control substrate 6 preferably does not have an upper flange portion (because a magnetic flux extends upward), but the chip coil 5 is not necessarily limited to this type.

In the sixth preferred embodiment, the loop antenna 2 and the capacitor 3 may be integrally provided in the lid member 73 by embedding them in the rear surface of the lid member 73, instead of being fixed on the rear surface of the lid member 73 via the resin film. The mobile communication apparatus is not limited to a mobile phone.

As described above, the present invention is useful for a reader/writer and a mobile communication apparatus. Particularly, the present invention is advantageous in that a communication cable to electrically connect a transmitting/receiving circuit on a control substrate and a loop antenna is unnecessary.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A reader/writer comprising:
an antenna substrate provided with a loop antenna;
a control substrate provided with a coil and with a transmitting/receiving circuit; and
a case; wherein
a magnetic coupling between the coil and the loop antenna causes the loop antenna and the transmitting/receiving circuit to be electromagnetically connected to each other;
the control substrate and the antenna substrate are fixed on the case;
the coil is arranged on a portion of the control substrate so as to face the antenna substrate with a space therebetween;
a magnetic sheet is arranged on a portion of a surface of the antenna substrate so as to face a portion of the control substrate, and the coil and the loop antenna are magnetically coupled through the space between the coil and the antenna substrate.

2. The reader/writer according to claim 1, wherein the coil provided on the control substrate is positioned inside an inner portion of the loop antenna and adjacent to the inner portion of the loop antenna.

3. The reader/writer according to claim 1, wherein the antenna substrate is provided with an opening inside the loop antenna and an upper portion of the coil is disposed to extend through the opening.

4. The reader/writer according to claim 1, wherein a plurality of coils are located on the control substrate.

5. The reader/writer according to claim 4, wherein magnetic sheets are fixed on the control substrate surrounding the coils, and magnetic sheets are fixed on a surface of the antenna substrate facing the control substrate.

6. The reader/writer according to claim 4, wherein the coils provided on the control substrate have opposite polarities.

7. The reader/writer according to claim 1, wherein the coil includes a transversely wound coil provided on the control substrate.

8. A mobile communication apparatus comprising;
a reader/writer including:
an antenna substrate provided with a loop antenna;
a control substrate provided with a coil and with a transmitting/receiving circuit; and
a case; wherein
a magnetic coupling between the coil and the loop antenna causes the loop antenna and the transmitting/receiving circuit to be electromagnetically connected to each other;
the control substrate and the antenna substrate are fixed on the case;
the coil is arranged on a portion of the control substrate so as to face the antenna substrate with a space therebetween;
a magnetic sheet is arranged on a portion of a surface of the antenna substrate so as to face a portion of the control substrate, and the coil and the loop antenna are magnetically coupled through the space between the coil and the antenna substrate.

9. The mobile communication apparatus according to claim 8, comprising a package including an opening and a lid member that can be fitted in the opening, the package including the control substrate arranged at a position facing the opening, and the lid member including the antenna substrate.

* * * * *